Dec. 27, 1955
C. J. SPERR, JR
2,728,878
CONTROL FOR ELECTROMAGNETS
Filed Aug. 2, 1954
2 Sheets-Sheet 1
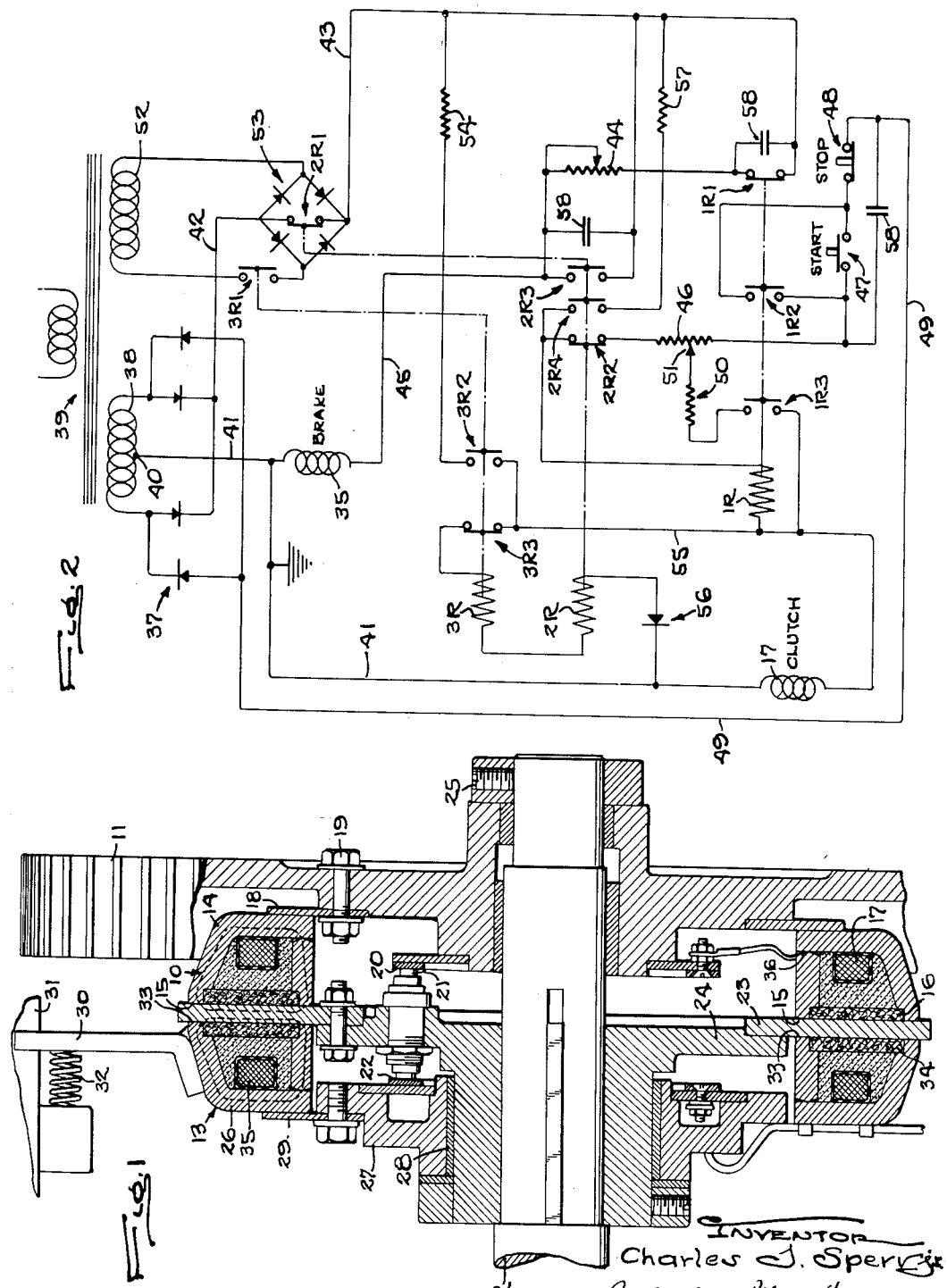
INVENTOR
Charles J. Sperr Jr
By Carlson, Pitzner, Hubbard & Wolfe
ATTORNEY

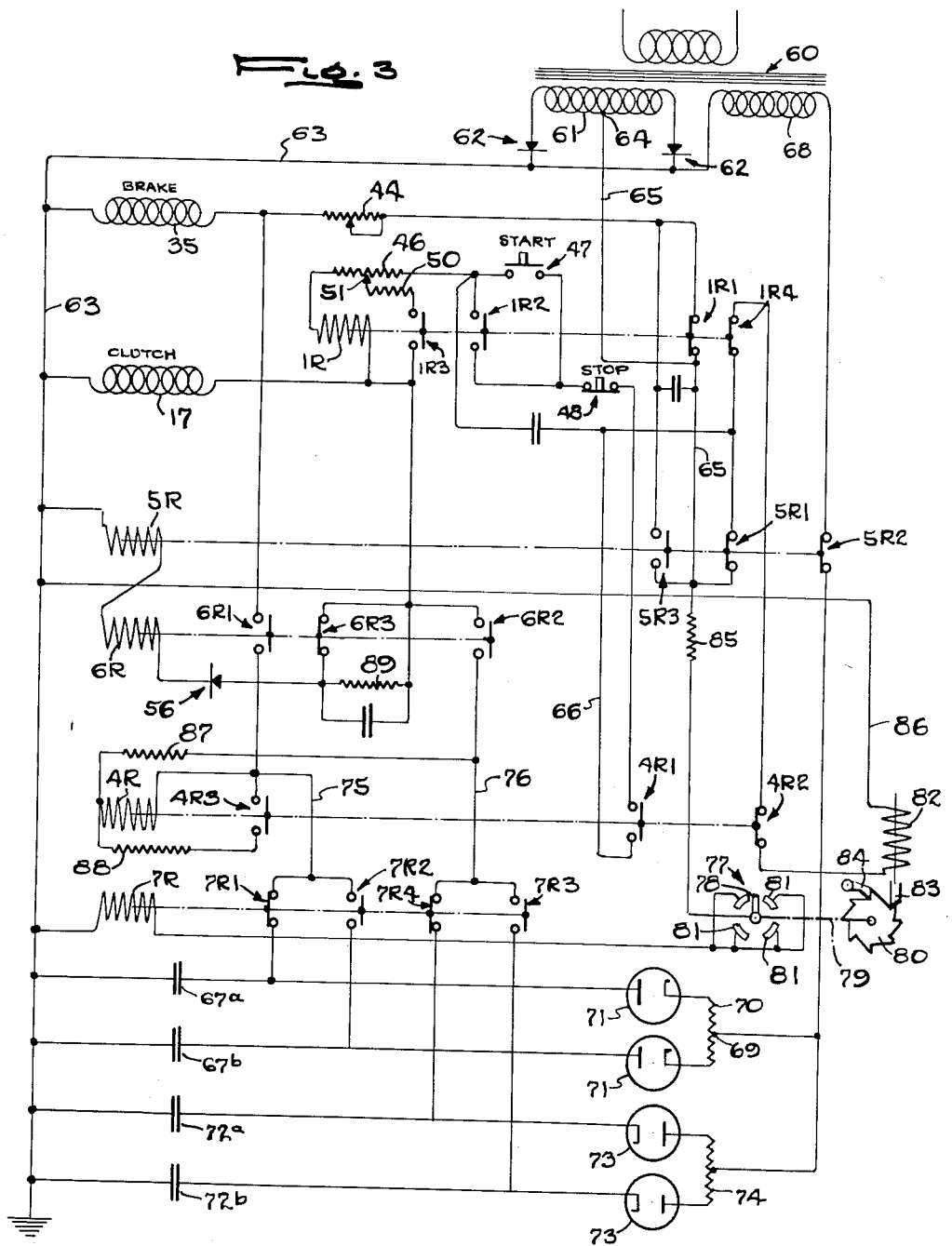

United States Patent Office 2,728,878
Patented Dec. 27, 1955

2,728,878

CONTROL FOR ELECTROMAGNETS

Charles J. Sperr, Jr., Beloit, Wis., assignor to Warner Electric Brake & Clutch Company, Beloit, Wis., a corporation of Wisconsin Application August 2, 1954, Serial No. 447,147

24 Claims. (Cl. 317—123)

This invention relates to a control for an electromagnet having a multiple turn annular winding and solid or unlaminated core and armature elements defining a magnetic flux circuit enclosing the winding. More particularly, the invention relates to a control of the type disclosed in Mason et al. application, Serial No. 190,176, filed October 14, 1950, now Patent No. 2,692,353, for reducing the time lag inherent in magnets of the above character between closure or opening of the energizing circuit for the winding and the full build-up or decay of the flux in the magnetic elements. In this control, rapid build-up and decay of flux in the magnetic elements is achieved by delivering to the winding as it is energized or deenergized a predetermined amount of electrical energy stored in capacitors at a voltage substantially higher than the normal energizing voltage of the winding.

The primary object of the present invention is to provide an improved control which, as compared with prior controls of the above character, is simpler and less expensive in construction, may be cycled or operated repeatedly at a substantially greater rate, and comprises more rugged parts less subject to breakdown even at the increased cycling rate whereby to prolong the service life of the control.

Another object is to deliver the desired amount of high voltage energy directly to the magnet winding from a high voltage source through a novel circuit arrangement by which the time lag between a change in the condition of the normal energizing circuit for the winding and closure of the high voltage circuit in response thereto is less than that required in prior controls.

A further object is to control the delivery of the high voltage energy by a relay which is energized in a novel manner in response to interruption of the normal energizing circuit for the winding to reduce the "no-action" time of the relay, that is, the time required for the relay to pull in after the relay coil is energized.

A more detailed object is to overexcite the relay at a voltage substantially higher than its rated voltage by interconnecting the magnet winding and the coil of the relay in a novel manner to apply to the latter the back voltage self-induced in the winding upon interruption of its energizing circuit.

Still another object is to provide a control of the above character having energy storage capacitors and to arrange the latter in a novel manner to increase the cycling rate of the control and, at the same time, avoid faulty operation resulting from breakdown of the capacitors.

The invention also resides in a novel circuit arrangement for controlling normal energizing circuits of the windings of two electromagnets by a single relay means while avoiding concurrent energization of the windings at low voltage and simplifying the delivery of higher voltage energy to the windings.

Other objects and advantages of the invention will become apparent from the following detailed description taken in connection with the accompanying drawings, in which Figure 1 is a fragmentary cross-sectional view of two electromagnetic devices adapted to be controlled in accordance with the present invention.

Fig. 2 is a wiring diagram of one form of the improved control as applied to an electromagnetic clutch and brake.

Fig. 3 is a wiring diagram of a modified form of the control.

While the invention is susceptible of various modifications and alternative constructions and may be practiced in various ways, we have shown in the drawings and will herein describe in detail the preferred embodiment. It is to be understood, however, that we do not intend to limit the invention by such disclosure but aim to cover all modifications and alternative constructions and methods falling within the spirit and scope of the invention as expressed in the appended claims.

For purposes of illustration, the invention is shown in the drawings as a control for an electromagnetic clutch 10 for transmitting rotary power from a driving element such as a gear 11 to a shaft 12 of a machine to be driven and an associated electromagnetic brake 13 for arresting the motion of the driven shaft 12 following interruption of the current to the clutch. The clutch shown in Fig. 1 by way of illustration is of the direct acting friction type and comprises a magnet ring 14 of U-shaped cross section having concentric axially projecting inner and outer pole pieces terminating in end faces 15 which are flush with each other and with the outer surface of nonmagnetic wear resistant segments 16 seated in and rigidly backed by the pole pieces. A coil 17 comprising a multiplicity of turns, for example 176, wound around the clutch axis is enclosed by the magnet ring 14 and fastened securely within the latter. Through the medium of a plate 18 and bolts 19, the magnet is fixed to the driving gear 11.

Current for energizing the coil 17 may be delivered through a slip ring 20 rotatable with the gear 11 and connected to one terminal of the coil, the other terminal being grounded. The ring engages one end of a contact 21 rotatable with the shaft 12 and bearing at its other end against a second insulated slip ring 22.

The pole faces 15 of the clutch magnet are spanned by a generally flat ring 23 of solid magnetic iron which constitutes both the magnet armature and the driven clutch member and which is bolted rigidly to a disk 24 whose hub is keyed to the driven shaft. The gear 11 floats freely on the shaft 12 so that the coacting faces of the magnet and armature may, while the magnet is deenergized, be held in close proximity to each other by an axially adjustable thrust member 25.

The brake 13 is also of the direct acting type preferably of the same general construction as the clutch and, to simplify the mounting of the brake and clutch parts, the armature ring 23 of the clutch may also constitute the armature of the brake. The brake magnet comprises a solid or unlaminated iron ring 26 of U-shaped cross section supported through a ring 27 and a bearing 28 therein on the hub of the disk 24, the ring 27 being in this instance bolted to a plate 29 welded to the back of the magnet ring. To hold the magnet against turning while providing some freedom of axial floating thereof, an arm 30 is made rigid with the magnet ring and projects loosely into a part 31 rigid with the frame which supports the driven shaft. Suitable light spring means 32 urges the magnet axially with sufficient force to overcome the commutator brush pressure and insure the maintenance of proper contact between the brake parts.

The pole pieces of the brake magnet 26 terminate in outer and inner end faces 33 which are flush with each other and with the outer face of nonmagnetic wear-resistant segments 34 seated on shoulders of the pole pieces. A coil 35 is secured rigidly between the pole pieces of the magnet ring and may comprise about 176 turns.

In the service operation of the clutch and brake described above, the magnetic flux circuits indicated by the dotted lines in Fig. 1 encircle the magnet coils and are substantially closed at all times. The parts of the circuits formed by the two magnetic elements are, in direct acting friction clutches and brakes of the type shown, composed of solid iron and are unlaminated. To reduce residual magnetism, narrow air gaps 36 may, if desired, be interposed in the magnetic flux circuits.

In the preferred form of the improved control shown in Fig. 2, current for normal energization of the windings 17 and 35 to maintain the clutch engaged or the brake applied is derived from a source comprising a rectifier 37 which may be of the selenium dry plate type and the secondary 38 of a transformer 39 by which the primary voltage is stepped down to a desired value for example, 30 volts. For a purpose to appear later, the rectifier is a bridge having the transformer secondary connected across its input terminals. A center tap 40 of the secondary is connected by a conductor 41 to the ground terminals of the clutch and brake windings. To complete the normal energizing circuit for the brake winding 35, one output terminal of the rectifier, in this instance the positive terminal, is connected to the insulated terminal of the brake winding through a conductor 42, normally closed contacts 2R1 of a high voltage control relay 2R, a conductor 43, normally closed contacts 1R1 of a low voltage control relay 1R, a variable resistor 44 of 4 ohms total resistance in this instance controlling the current flow of the circuit, and a conductor 45 in series.

To facilitate use of the control in a so-called "normally closed" detection system in which interruption of a main control circuit results in shutdown of a machine driven through the clutch, both the low voltage energizing circuit of the brake winding traced above and that of the clutch winding 17 preferably are controlled by the same low voltage relay 1R whose coil is connected in series with the clutch winding in the low voltage circuit for the latter. Such circuit, which extends from the insulated terminal of the clutch winding to the negative terminal of the rectifier 37, includes in series the relay coil 1R, normally closed contacts 2R2 of the high voltage control relay 2R, a resistor 46, normally open holding contacts 1R2 of the low voltage control relay 1R in parallel with a normally open start switch 47, a normally closed stop switch 48, and a conductor 49. Although the start and stop switches 47 and 48 are shown as of the manually operable push button type, they may be operated automatically as is desirable in correlating the action of the clutch and brake with the cycle of a machine driven through the clutch. By virtue of the arrangement of the transformer secondary 38 and the bridge rectifier 37, the latter, in effect, constitutes two full wave rectifiers one for each winding with a common voltage supply and a common return through the center tap 40.

Under the conditions illustrated in Fig. 2, the low voltage relay 1R is deenergized and low voltage brake winding circuit is completed through the normally closed contacts 1R1 of the relay. To release the brake and engage the clutch, the start switch 47 is closed to complete the low voltage circuit to the clutch winding 17 through the coil of the low voltage relay 1R. As soon as the current in this circuit builds up sufficiently for pull-in of the relay and the latter pulls in, its contacts 1R2 close to complete the holding circuit for the clutch winding and the relay around the start switch 47 and the normally closed contacts 1R1 open to interrupt the low voltage circuit through the brake winding 35. Due to the inductance of the clutch winding 17, the current build-up in the latter and the relay coil is slower than desired. When the start switch is closed and until such time as the relay 1R pulls in, both the clutch and brake windings are energized so that the brake and clutch magnet rings 26 and 14 engage the armature ring 23 concurrently with the result that opposing forces and an undesirable friction drag are applied to the armature tending to increase the wear of the latter.

To provide for rapid actuation of the control relay 1R and thereby avoid concurrent energization of the clutch and brake windings 17 and 35 at low voltages and the accompanying difficulties described above, the present invention, in one of its aspects, contemplates overexciting the coil of the relay to reduce the time required for pull-in thereof in response to closure of the start switch 47. For this purpose, the elements of the low voltage clutch winding circuit traced above are selected to produce a current flow therein equal to approximately three times the rated current of the relay coil 1R and normally open contacts 1R3 of the latter are arranged in a shunt circuit around the relay coil to complete such circuit when the relay pulls in. This shunt circuit comprises, in series, the relay contacts 1R3, a resistor 50, and a variable tap 51 on the resistor 46 and its elements are selected to provide a current flow in the relay coil within the rated current of the latter when the shunt circuit is closed, the resistors 46 and 50 in this instance each having a total value of 4 ohms. Upon initial closure of the start switch 47, the relay coil is overexcited by the greater than normal current flow therein for rapid pull-in of the relay. As soon as such pull-in occurs to close the shunt circuit and open the brake winding circuit, the relay current drops to a value within its rated value, the variable tap 51 on the resistor 46 providing adjustment of the clutch winding current.

In the present instance, the value of the normal energizing current for the relay coil 1R is approximately 1 ampere, the overexcitation current flowing through the coil after the start switch 47 is closed and before the relay pulls in to close the shunt circuit around the coil being approximately 3 amperes. The low voltage relay and the other relays used in both forms of the improved control are of the type having a contact carrying armature spring urged to one limit position in which normally closed contacts of the relay are closed and normally open contacts are open, the armature shifting to its other limit position when the relay coil is energized. This type of relay also is characterized by a delay between energization of the relay coil at its rated voltage and pull-in of the relay, that is, shifting of the armature into its energized limit position, and between deenergization of the coil and drop-out of the relay or shifting of the armature into its other limit position. Thus different relays may have different pull-in and drop-out times depending on such factors as coil inductance, armature size, and return spring strength. In the use of such relays the interval between energization of the coil and pull-in of the relay is referred to as the "no-action" time.

An electromagnet such as those described above having an unlaminated magnetic circuit is characterized by inherent time lags between completion of the normal energizing circuit for the winding and build-up of the flux in the magnetic elements to approximately its full value and between interruption of the energizing circuit and decay of the magnetic flux to an ineffectual value. To reduce such lags, a predetermined amount of electrical energy is delivered to the winding at a voltage substantially higher than the normal energizing voltage of the winding and in timed relation to completion or interruption of the winding energizing circuit as described above. In the case of the clutch winding 17 where rapid flux decay is desired in response to interruption of its low voltage energizing circuit, the high voltage energy is delivered in a direction opposite to the normal current flow in the winding, the direction of high voltage energy delivery to the brake winding 35 for rapid flux build-up being in the same direction as the normal current flow.

In the preferred form of control shown in Fig. 2, the high voltage energy is delivered directly to the clutch and brake windings 17 and 35 from a source comprising a secondary 52 of the transformer 39 and a full wave rectifier 53, in this instance a bridge of the selenium dry plate type having its input terminals adapted for connection to opposite ends of the secondary. Herein, the voltage across the latter is equal approximately to 115 volts. To simplify the circuitry and avoid the application of high voltages to the elements of the low voltage rectifier 37 in the reverse or blocking direction of such elements, it is preferred to apply the high voltage energy in series with the low voltage source.

Herein, the high voltage rectifier 53 is connected continuously in series with the low voltage rectifier 37 and is disconnected from the transformer secondary 52 until the high voltage energy is to be delivered to the windings. For this purpose, normally open contacts 3R1 of the second high voltage relay 3R are connected in series with the secondary between the input terminals of the rectifier. The negative and positive output terminals of the latter are connected respectively to the conductors 42 and 43 on opposite sides of the normally closed contacts 2R1 of the first high voltage relay 2R. With this arrangement, pull-in of the two high voltage relays 2R and 3R renders the high voltage rectifier effective to apply its output in series with the low voltage rectifier. When the relays drop out, the high voltage rectifier is disconnected from the transformer and the short circuit is completed between its output terminals and the conductors 42 and 43.

By virtue of the novel arrangement of the low voltage circuits for the windings including the center tapped transformer secondary 38 across the input terminals of the low voltage bridge rectifier 37 described above, such delivery of high voltage energy in series with the latter may be effected without applying the high voltage in a reverse direction through any of the rectifier elements. Thus, with the negative terminal of the high voltage rectifier 53 connected to the positive terminal of the low voltage rectifier 37, the high voltage energy is applied in a forward direction through those rectifier elements which are connected to the positive terminal of the low voltage rectifier and the largest back voltage which the elements of this rectifier must withstand is equal to the peak voltage of the low voltage secondary 38. Accordingly, these elements may be small in rating and of low cost.

To complete the high voltage energy circuit for the clutch winding 17, a resistor 54 and normally open contacts 3R2 of the second high voltage relay 3R are connected in series between the conductor 43 and the insulated terminal 55 of the winding. The remainder of the circuits extends from ground to the negative terminal of the high voltage rectifier 53 through the center tap 40 of the low voltage transformer secondary 38, the opposite halves of the latter, the positive terminal of the low voltage rectifier 37, and the conductor 42 which is common to the high voltage energy circuit for the brake winding 35. This latter circuit is completed by normally open contacts 2R3 of the relay 2R connected between the conductor 43 and the conductor 45 or the insulated terminal of the winding. It will be seen that pull-in of the high voltage relays 2R and 3R, in addition to connection of the high voltage rectifier 53 to its transformer secondary 52, results in completion of the high voltage circuits through the clutch and brake windings 17 and 35.

The high voltage relays 2R and 3R are energized in response to interruption of the low voltage clutch winding circuit to effect rapid build-up of flux in the brake elements and decay of the flux in the clutch elements. In some applications of controls of this character, it is desired to stop a driven part such as the shaft 12 so quickly that the "no-action" time is objectionably long. With relays of the type used herein, the "no-action" time when the relay coil is energized at approximately its rated voltage is 22 to 25 milliseconds.

In accordance with a major aspect of the present invention, the foregoing difficulty is overcome while still permitting the use of relays to control the high voltage energy delivery circuits by utilizing the self-induced back voltage of the clutch winding 17 resulting from interruption of its normal energizing circuit to overexcite the high voltage relay coils 2R and 3R at many times their rated voltage and thereby achieve a substantial reduction in the "no-action" time of the relays. To this end, the relay coils are connected in series with the clutch winding in a circuit which is normally closed so that as soon as the low voltage energizing circuit is opened, the back voltage of the clutch winding is applied immediately to the relay coils. Such connection of the relay coils is permitted by including in series with the coils a rectifier 56 which is poled to pass current derived from the back voltage in the clutch winding while blocking current from the low voltage rectifier 37 when the low voltage clutch circuit is closed.

To take full advantage of the characteristic of inductive windings that the value of the self-induced back voltage resulting from interruption of energizing circuits therethrough varies in proportion to the resistance of any circuit in which the winding remains connected, the series circuit through the relay coils 2R and 3R, the clutch winding 17, and the rectifier 56 is completed by normally closed contacts 3R3 of the relay 3R. Thus, upon initial interruption of the low voltage clutch winding circuit, the relay 3R is energized by the back voltage of the winding sufficiently to open the contacts 3R3. When the interruption of the low voltage clutch winding circuit occurs, the value of the back voltage increases substantially instantaneously to a high value sufficient to produce the desired overexcitation of the relays 2R and 3R. While a single relay may be utilized to perform the functions of the two relays 2R and 3R, it is preferred to use the two relays as shown to reduce the inertia of the moving parts of such relays and therefore the energy required to achieve pull-in of the relays in the desired short time interval. In this instance, these relays are rated at 2 volts and 1 ampere respectively.

In one control embodying the above circuit arrangement, a clutch magnet having a diameter of approximately 15 inches and a coil with 176 turns of No. 14 wire normally energized at 6 to 8 volts developed a back voltage of approximately 300 volts or nearly 150 times the rating of 2 volts for each relay. When overexcited at this voltage, the "no-action" time for each relay was approximately 6 milliseconds as compared to the 22 to 25 milliseconds required for pull-in of the relays when energized at their rated voltages as noted above.

The circuits through the clutch and brake windings 17 and 35 and the high voltage rectifier 53 are maintained closed long enough to achieve build-up of flux in the magnetic elements of the brake 13 substantially to its full value and decay of the flux in the clutch elements to its desired ineffectual low value. This interval of time depends on the value of the rectifier output voltage and the characteristics of the magnets and, in the case of the specific magnets referred to above, has been found to equal approximately 16 milliseconds which is the normal drop-out time of the high voltage relays 2R and 3R, that is, the time required for normally closed contacts of each relay to close after its coils is deenergized. Advantage is taken of this relationship to utilize interruption of the low resistance series circuit through the clutch winding 17 and the relay coils 2R and 3R not only to produce an abrupt rise in the self-induced back voltage of the winding for overexcitation of the relays, but also to time the high voltage impulses to the windings by permitting the relays to drop out normally. Thus, no separate circuit for timing energization of the relays is required.

To avoid interruption of energization of the brake winding 35, it is desirable to insure that its low voltage energizing circuit is completed before the high voltage circuit is interrupted. This is accomplished in accordance with another aspect of the invention by accelerating drop-out of the low voltage control relay 1R for closure of its contacts 1R1 before the contacts 2R3 are opened by drop-out of the high voltage control relay 2R. Such acceleration is effected in two ways. First, the shunt circuit around the coil of the low voltage relay and through the normally open contacts 1R3 thereof is interrupted by pull-in of the high voltage relay 2R, the normally closed contacts 2R2 of the latter being included in series with the relay coil in this shunt circuit for this purpose.

Drop-out of the low voltage relay 1R is accelerated further by energizing the relay coil in the reverse direction in response to interruption of the low voltage clutch circuit. Energy from the high voltage source is utilized for such reverse energization by connecting normally open contacts 2R4 of the first high voltage relay 2R in series with a resistor 57 and the low voltage relay coil 1R between the conductors 43 and 55 and across the resistor 54 which is in series with the clutch winding 17 in the latter's high voltage circuit through the relay contacts 3R2. Such utilization of energy from the high voltage clutch circuit for reverse energization of the low voltage relay is possible because less energy is required in the clutch winding to achieve rapid decay of flux in the magnetic elements of the clutch 10 to its desired value than is needed for flux build-up in the brake elements. In this instance, the resistors 54 and 57 have values of 50 ohms and 1000 ohms respectively for energization of the low voltage relay 1R in the reverse direction at approximately its rated voltage.

To reduce arcing across various ones of the relay contacts and the switches 47 and 48 arc suppression capacitors 58 of suitable value are connected across these contacts and switches as shown.

In the operation of the improved control described above, let it be assumed that the transformer primary is energized by connection to a suitable alternating current source and all of the relays are deenergized with their armatures in their dropped out positions as shown in Fig. 2, the brake winding 35 being energized through the normally closed relay contacts 1R1 while the low voltage circuit for the clutch winding 17 is open at the normally open contacts 1R2 and the start switch 47 and the high voltage rectifier 53 is disconnected from its transformer secondary 52 at the normally open contacts 3R1. When it is desired to transmit power to the driven shaft 12, the start switch 47 is closed to complete the circuit connecting the clutch winding and the low voltage relay coil 1R in series between the center tap 40 and the negative terminal of the low voltage rectifier 37. As a result, the relay is overexcited and pulls in rapidly to open the contacts 1R1 in the low voltage brake circuit and to close the contacts 1R2 in the holding circuit around the start switch. Also, the contacts 1R3 in the shunt circuit around the relay coil are closed to reduce the current flow in the latter to approximately its rated value. The clutch 10 then is applied and the brake 13 is released, no current flowing through the closed circuit through the high voltage relay coils 2R and 3R because of the series rectifier 56.

Upon interruption of the low voltage clutch circuit by depression of the stop switch 48, the self-induced back voltage resulting therefrom is applied to the high voltage relay coils 2R and 3R as permitted by the rectifier 56 in the only closed circuit then extending through the clutch winding 17. This energizes the relays sufficiently that they begin to pull in to open the normally closed contacts 3R3 in the back voltage circuit. This produces a substantial increase in the back voltage to overexcite the relays and accelerate their pull-in. The normally open contacts 3R1 and 3R2 are closed by such pull-in to connect the high voltage rectifier 53 to its energizing transformer secondary 52 and to complete the high voltage circuit for reverse energization of the clutch winding. Also, the normally closed contacts 2R1 and 2R2 are opened to interrupt the short circuit between the output terminals of the high voltage rectifier 53 and the shunt circuit around the low voltage relay 1R, and the high voltage circuits to the latter and the brake winding are completed by closure of the contacts 2R3 and 2R4.

Such closure of the high voltage circuits continues until the high voltage relays drop out following opening of the contacts 3R3 and results in rapid build-up of flux in the brake elements and decay of flux in the clutch elements. Before these circuits are opened, however, the low voltage relay 1R drops out by virtue of interruption of its shunt circuit and its reverse energization from the high voltage source, and the contacts 1R1 close to complete the low voltage brake circuit. The control is then returned to its initial condition and is ready to be recycled immediately.

The novel manner of overexciting high voltage control relays to accelerate pull-in of the relays in response to interruption of the low voltage circuit to the clutch winding 17 also is applicable to a control in which the energy to be delivered to the clutch and brake windings 17 and 35 at a high voltage is stored in capacitors. Such a control is shown in Fig. 3 in which parts corresponding to parts described above in the preferred control are indicated by the same reference characters.

Current for energizing the brake winding 35 at a low voltage in the modified control of Fig. 3 is derived from a direct current source comprising a center tapped secondary 61 of a transformer 60 by which the primary voltage is stepped down to 42 volts. Rectifiers 62 connected to opposite ends of the secondary are connected together and to a common grounded terminal conductor 63 of the clutch and brake windings 17 and 35 and are poled to provide the positive terminal of the source. To complete the low voltage brake circuit, the insulated terminal of the brake winding is connected to the center tap 64 of the secondary, that is, the negative terminal of the source, by the variable resistor 44, the normally closed contacts 1R1 of the low voltage relay 1R, and a conductor 65.

The low voltage energizing circuit for the clutch winding 17 which extends from the insulated terminal of the latter to the center tap conductor 65 is generally similar to that of the preferred form and includes the coil of the low voltage control relay 1R in series with the resistor 46 and the start and stop switches 47 and 48, the normally open contacts 1R2 being connected in the holding circuit around the start switch. To accelerate pull-in of this relay, the normally open contacts 1R3 thereof are connected in series with the resistor 50 and the variable tap 51 on the resistor 46 to form a shunt around the relay coil the same as in the preferred control. For a purpose to appear later, the low voltage clutch winding circuit is completed by normally open contacts 4R1 of a safety relay 4R, a conductor 66, and normally closed contacts 5R1 of a slow action high voltage control relay 5R in series with the stop switch 48 between the latter and the center tap conductor 65.

Energy for delivery at high voltage to the clutch winding 17 in a reverse direction for rapid decay of flux in the clutch elements and to the brake winding 35 for rapid flux build-up is accumulated in capacitors and then is discharged through the respective windings by completion of high voltage capacitor discharge circuits therethrough in response to interruption of the low voltage clutch circuit. To reduce the duty requirement of each capacitor while increasing the permissible rate of cycling of the control, the invention contemplates a novel arrangement of a plurality of capacitors and switching means therefor by which the capacitors are rendered effective in the discharge circuits successively in response to discharge of the next previous capacitor through the discharge circuits. Since different amounts of energy are required to produce the desired flux build-up in the brake elements and flux decay in the clutch elements, it is preferred to provide a separate bank of capacitors for each of the windings as shown.

In the present instance, the capacitor bank for the brake winding 35 comprises two capacitors 67a and 67b which are alternately switched into and out of a capacitor discharge circuit through the winding. Energy for charging the capacitors is derived from a high voltage secondary 68 of the transformer 60 connected in series with normally closed contacts 5R2 of the slow high voltage relay 5R between the common ground terminal 63 of the clutch and brake windings and the center tap 69 of a resistor 70. One end terminal of the latter is connected to one side of each of the capacitors 67a and 67b through a diode rectifier 71. The charging circuits are completed by connection of the other sides of the capacitors to the ground terminal, the plates of the diodes being connected to these capacitors so that the grounded sides of the latter are charged positively when the contacts 5R2 are closed to complete the charging circuits.

A similar bank of two capacitors 72a and 72b is utilized to store high voltage energy for the clutch winding 17, these capacitors being connected respectively between the grounded terminal and the cathodes of two diodes 73 whose plates are connected to the secondary 68 through opposite halves of a resistor 74 and the normally closed slow relay contacts 5R2. With this arrangement, the grounded sides of the clutch capacitors are charged negatively. In the present instance, each of the clutch capacitors 72a and 72b has a capacity of 80 microfarads as compared to 240 microfarads for each of the brake capacitors 67a and 67b.

The circuit for discharging the capacitors 67a and 67b through the brake winding 35 extends from the positive sides of the capacitors at ground to a conductor 75 through the winding and normally open contacts 6R1 of a fast action high voltage control relay 6R. The conductor 75 is connected to the negative sides of the capacitors through normally closed contacts 7R1 and normally open contacts 7R2 respectively of a capacitor control relay 7R. When the latter is pulled in, the capacitor 67b is connected into the discharge circuit and the other capacitor 67a is disconnected therefrom, the reverse being true when the relay drops out.

A similar capacitor discharge circuit for the clutch winding 17 extends from the negative side of its capacitors 72a and 72b at ground to a conductor 76 through the winding and normally open contacts 6R2 of the fast action relay 6R. The positive sides of the capacitors are connected individually to the conductor 76 through normally open contacts 7R3 and normally closed contacts 7R4 of the capacitor relay 7R for connection of one capacitor 72a into the discharge circuit when the relay drops out and of the other capacitor 72b into the circuit when the relay pulls in.

In addition to the capacitor control relay 7R, the switching means for rendering the respective energy storage capacitors effective successively in their associated discharge circuits, in this instance, includes a stepping mechanism 77 which controls energization of the capacitor switching relay 7R and is actuated in response to changes in the voltage of the capacitors connected in the capacitor discharge circuits. This stepping mechanism comprises a rotary contact member 78 which is fast on a shaft 79 carrying a ratchet wheel 80. The rotary contact 78 is moved alternately into and out of engagement with spaced fixed contacts 81 by successive energization of a coil 82 which results in advance of a pawl 83 to rotate the wheel. A holding pawl 84 engages the wheel to prevent reverse rotation thereof after each advance of the actuating pawl 83. The rotary contact 78 is connected through a resistor 85 to the center tap conductor 65 and the fixed contacts 81 are connected to ground through the capacitor relay coil 7R to complete a low voltage energizing circuit for the latter when the rotary contact engages a fixed contact. Thus, upon successive energizations of the stepping coil, the capacitor relay 7R is alternately energized and deenergized to render the respective capacitors of each bank effective alternately in their discharge circuits. The energizing circuit for the stepping coil 82 extends from ground to the center tap conductor 65 through a conductor 86, the coil, normally closed contacts 4R2 of the safety relay 4R, the normally closed contacts 5R1 of the slow action relay 5R, and normally closed contacts 1R4 of the low voltage control relay 1R.

To energize the stepping coil 82 in response to discharge of capacitors through the windings 17 and 35, the coil of the safety relay 4R, whose normally closed contacts 4R2 are in the energizing circuit for the stepping coil, is connected in series with the capacitors effective in the capacitor discharge circuits for pull-in of the relay when both of these capacitors are charged substantially to their full voltage and for drop-out of the relay if the voltage of either capacitor drops below a predetermined level. This series circuit through the capacitors and the relay coil 4R is completed simply by connecting the latter in series with a resistor 87 across the conductors 75 and 76 in the capacitor discharge circuits, the value of the resistor being relatively high, on the order of 160,000 ohms, to limit current flow through the coil and avoid dissipation of the energy stored in the capacitors. In this series circuit through the safety relay coil, the voltages of the capacitors therein are additive.

Being responsive to the voltage of the energy storage capacitors which are connected into the two capacitor discharge circuits, the safety relay 4R may be utilized to perform the additional function of conditioning the low voltage circuit for the clutch winding 17 for energization of the latter only when the capacitors are charged substantially to their full voltage and ready to be discharged through the windings to effect quick stopping of the shaft 12. Thus, the relay may detect unsafe conditions such as low line voltages and capacitor failure. Such protection is achieved by including the normally open contacts 4R1 of the safety relay in series with the stop switch 48 in the low voltage energizing circuit for the clutch winding.

With the arrangement of the safety relay 4R thus far described, the relay will pull in to deenergize the stepping coil 82 and condition the low voltage clutch circuit for closure when both of the capacitors then effective in the discharge circuits are charged substantially to their full voltages of 400 volts each so that the sum of these voltages appearing across the conductors 75 and 76 equals approximately 800 volts. The relay will drop out to open the normal energizing circuit for the clutch winding 17 and close the contacts 4R2 in the energizing circuit for the stepping coil 82 when the voltage of either or both of the capacitors drops to reduce the sum of the voltages to approximately 300 volts. It will be seen that this voltage differential between pull-in and drop-out of the safety relay is near the charged voltage of one of the energy storage capacitors giving rise to the possibility of failure of one capacitor or a drop in the voltage of both capacitors below the desired full charged value without detection of such failure or voltage drop by the relay.

To permit a relay characterized by a large differential between its normal pull-in and drop-out voltages to be used as the safety relay 4R while still reducing the differential between the voltages of the energy storage capacitors at which the safety relay pulls in and drops out, normally open contacts 4R3 of the relay are connected in series with a resistor 88 in a shunt across the relay coil and in series with the higher resistance 87. When this shunt is closed by pull-in of the relay, the relay coil, in effect, is connected across a part of a voltage divider made up of the two resistors 87 and 88 and a smaller portion of the sum of the capacitor voltages is applied across the relay coil than when the shunt is open. As a result, the value of the sum of the capacitor voltages at which the relay drops out is raised substantially without requiring a relay having a small normal operating differential. In the present instance, the value of the shunt resistor 88 is around 13,000 ohms and the value of the sum of capacitor voltages at which the relay drops out equals approximately 500 volts. Each of the resistors 87 and 88 has been shown as a single element but, if desired, may comprise a series-parallel arrangement of resistance elements to reduce power losses as is well known in the art.

To obtain rapid pull-in of the high voltage control relays 5R and 6R in response to interruption of the low voltage clutch circuit, the coils of these relays are connected in series with the rectifier 56 and normally closed contacts 6R3 of the fast action relay 6R across the clutch winding 17 as in the preferred control of Fig. 2. In the modified control where the high voltage energy is stored in capacitors and is delivered upon discharge of the latter, it is desirable to close the low voltage energizing circuit through the brake winding 35 before the flux produced by the capacitor discharge through the winding has receded beyond its peak value as described in copending application Serial No. 190,176 referred to above and before the high voltage circuit is opened as in the preferred control.

To achieve such timing in the modified control while permitting normal drop-out of the low voltage control relay 1R after its energizing circuit through the clutch is interrupted, normally open contacts 5R3 of the slow relay 5R are connected in parallel with the contacts 1R1 to complete an auxiliary low voltage circuit through the brake winding simultaneously with closure of the capacitor discharge circuits. Also, the high voltage relays are connected into a timing circuit in response to pull-in of the relays and have different operating characteristics such that the fast relay 6R drops out to open the capacitor discharge circuits before the low voltage relay drops out and the slow relay 5R drops out before the low voltage relay to insure that energization of the brake winding at the low voltage is uninterrupted. In the present instance, the fast and slow relays have the same voltage rating of two volts, but the fast relay 6R is a large heavy duty type of relay requiring more energy to maintain the relay pulled-in than the slow relay 5R which is a smaller light duty relay. Thus, when these relays are connected into their timing circuit and an impulse of energy is delivered to the relay coils, the fast relay drops out before the slow relay. Due to the overexcitation of the coils of the relays by the self-induced back voltage of the clutch winding, pull-in of the relays is substantially simultaneous in spite of their different operating characteristics.

The circuit for timing the drop-out of the high voltage relays 5R and 6R is of the resistance-capacitance type and, to take advantage of circuit elements already available in the control, includes the effective one of the energy storage capacitors 72a and 72b for the clutch winding. Herein, this timing circuit is completed by connecting a resistor 89 across the normally closed relay contacts 6R3 in series with the coils of the high voltage relays. Thus, the relay coils and the resistor 89 are connected continuously across the clutch winding 17 so that, when the capacitor discharge circuit through the clutch winding is completed by closure of the contacts 6R2, a portion of the energy stored in the capacitor is discharged through the coils of the high voltage relays to maintain the latter energized. After the major portion of the capacitor energy has been discharged, in approximately 16 milliseconds in this instance, the fast relay drops out to open the capacitor discharge circuits at the contacts 6R2, the slow relay 5R remaining pulled in several times as long as the fast relay due to its different operating characteristics. The value of the resistor 89, in this instance 50 ohms, is selected to divert a major portion of the capacitor discharge energy through the clutch winding 17 to produce the desired rapid decay of the flux in the magnetic elements of the clutch.

In the operation of the modified control, let it be assumed that all of the relays are dropped out as shown in Fig. 3 and that the primary winding of the transformer 60 has been connected to a suitable alternating current source an insufficient length of time for the capacitors 67a, 67b, 72a, and 72b to have become charged to their full value. Under such conditions, the brake winding 35 is energized at a low voltage through the normally closed contacts 1R1, the energizing circuit for the stepping coil 82 is closed through the safety relay contacts 4R2, the capacitors are becoming charged through the normally closed contacts 5R2, the contacts 7R1 and 7R4 of the capacitor relay 7R are closed so that the capacitors 67a and 72a are connected into the capacitor discharge circuits, and the contacts 4R1 of the safety relay 4R are open to disable the low voltage clutch winding circuit. If, for any reason such as an open circuit or failure of either of the capacitors 67a and 72a, the latter fail to become charged to their full value, the safety relay will not pull in and the clutch circuit will remain disabled. Assuming, however, that the capacitors 67a and 72a do become charged to their full value, the safety relay 4R pulls in to open the energizing circuit for the stepping coil 82 and to close the contacts 4R1 to condition the low voltage clutch circuit for closure by depression of the start switch 47.

With pull-in of the safety relay 4R, the control is conditioned for operation. The transmission of power to the driven shaft 12 is initiated by closure of the start switch 47 which completes a series circuit through the low voltage relay coil 1R and the clutch winding 17 to overexcite the relay for rapid pull-in thereof. As soon as the relay pulls in, the brake circuit is opened at the contacts 1R1 and the holding circuit around the start switch is completed at the contacts 1R2. Also, the shunt circuit around the relay coil 1R is completed by closure of the contacts 1R3 to reduce the relay coil current to a value within its rated value.

Upon interruption of the low voltage circuit through the clutch winding 17 as by depression of the stop switch 48, or drop-out of the safety relay 4R, the high voltage control relays 5R and 6R in series with the clutch winding are overexcited by the self-induced back voltage in the winding for rapid pull-in of these relays. As soon as the fast action relay 6R begins to pull in, the contacts 6R3 thereof in series with the coils open to interrupt the low resistance circuit through the coils to produce a substantial increase in the back voltage while leaving the coils connected in a higher resistance circuit through the clutch winding and the resistor 89. Pull-in of the fast relay 6R also results in closure of the capacitor discharge circuits through the respective windings at the contacts 6R1 and 6R2, the brake circuit extending from the grounded terminal 63 and through the capacitor 67a, the contacts 7R1, the conductor 75, and the contacts 6R1. The clutch circuit extends from the grounded terminal through the capacitor 72a, the contacts 7R4, the conductor 76, and the contacts 6R2. Pull-in of the slow action relay 5R results in interruption of the capacitor charging circuit at the contacts 5R2, disabling of the stepping coil circuit at the contacts 5R1, and completion of a low voltage circuit through the brake winding by closure of contacts 5R3 in parallel with the normally closed low voltage relay contacts 1R1, the current flow in this latter circuit being in the same direction through the brake winding as the capacitor discharge current.

As a result of the capacitor discharge through the windings 17 and 35, in the same direction as normal energizing current flow in the brake winding and in the opposite direction in the clutch winding, flux builds up rapidly in the magnetic elements of the brake and the flux in the clutch elements decays rapidly. In magnetic friction devices of the type described in connection with the preferred control, such build-up to approximately 90 per cent of the full flux of the brake elements occurs within approximately 10 milliseconds after pull-in of the fast relay 6R. Such pull-in requiring approximately 6 milliseconds, the total time for flux build-up after interruption of the clutch circuit requires approximately 16 milliseconds. Substantially the same time interval is required for decay of the flux in the clutch elements substantially to zero.

Simultaneously with completion of the capacitor discharge circuit through the clutch winding 17 by closure of the contacts 6R2, the timing circuit for the high voltage relays 5R and 6R is completed through the capacitor 72a since the relay coils are connected in series with the rectifier 56 and the resistor 89 across the clutch winding. Approximately 16 milliseconds after closure of the capacitor discharge circuits when the voltage of the clutch capacitor 72a has dropped substantially, the fast relay 6R drops out to interrupt the capacitor discharge circuits and the timing circuit at the contacts 6R2. The slow relay 5R, due to its different characteristics and to the energy received from the capacitor discharge, remains pulled in several, herein approximately five, times as long as the fast relay to maintain the low voltage brake circuit closed at the contacts 5R3 until after the low voltage relay 1R has dropped out to close the contacts 1R1 in the brake circuit. Then, the relay 5R drops out and its normally closed contacts 5R1 and 5R2 close in the stepping coil circuit and the capacitor charging circuit.

When the sum of the voltages of the capacitors 67a and 72a drops to approximately 500 volts during their discharge, the safety relay 4R, which is responsive to this sum, drops out to close the contacts 4R2 in the stepping coil circuit and to disable the clutch circuit at the contacts 4R1. The joint closure of the contacts 4R2, 1R4, and 5R1 upon drop-out of the three relays 4R, 1R, and 5R completes the circuit through the stepping coil 82 so that the latter is energized to shift the pawl 83 to advance the ratchet wheel 80 and the rotary contact 78 one step. This moves the rotary contact into engagement with one of the fixed contacts 81 to complete the circuit for the capacitor switching relay 7R. When this relay pulls in, the discharged capacitors 67a and 72a are disconnected from the capacitor discharge circuits by opening of the contacts 7R1 and 7R4 and the other capacitors 67b and 72b are connected into these circuits by closure of the contacts 7R2 and 7R3. Assuming that the other capacitors 67b and 72b are substantially fully charged, the safety relay 4R will pull in to interrupt the stepping coil circuit and to condition the low voltage clutch circuit for closure by the start switch 47. The control then is ready for another cycle of operation.

Of the two forms of the invention described above, the preferred form is particularly suited for operation where it is desired to recycle the control at a rapid rate. Thus, the preferred form has been found to be capable of operation as frequently as 120 times per minute. Such rapid recycling is made possible primarily by the novel circuit arrangement described above for connecting the windings 17 and 35 directly to the high voltage source 53 and then interrupting such connection after a predetermined time interval of sufficient length for delivery of the desired amount of high voltage energy to the winding. This arrangement thus eliminates the necessity of costly energy storage capacitors which, in some cases, require as long as several seconds to become charged to the desired voltage and which are subject to breakdown when charged and discharged more frequently than a few, for example 5 or 6, times per minute. The modified control on the other hand, is especially advantageous where very rapid flux build-up in the magnetic elements of the brake and a correspondingly rapid decrease of flux in the clutch elements are desired. As pointed out above, the modified control is capable of delivering sufficient energy to produce the desired flux changes in the clutch and brake elements in approximately 16 milliseconds are compared with approximately 22 milliseconds required in the preferred control. In both controls, such short time intervals are made possible by the novel manner of connecting the high voltage control relays to the clutch winding 17 to enable the back voltage developed in the latter in response to interruption of the normal energizing circuit therefor to be utilized to overexcite such relays and substantially reduce their pull-in time.

I claim as my invention:

1. The combination of, two electromagnets having first and second windings respectively, means providing a source of unidirectional voltage, a first circuit through which said first winding may be energized from said source, a plurality of capacitors each adapted to store energy for delivery to said second winding at a voltage substantially higher than said source voltage, a circuit adapted when closed to discharge the one of said capacitors connected therein through said second winding, means for charging said capacitors with said energy, a switching device adapted to connect said capacitors one by one into said discharge circuit and operable when actuated to disconnect one capacitor from the circuit and connect the next succeeding charged capacitor into the circuit, a relay responsive to interruption of said first circuit and operable substantially simultaneously therewith to complete said discharge circuit for a predetermined short time interval for discharge of the capacitor in the circuit and to open the circuit at the end of such interval, a second relay responsive to interruption of said first circuit and operable within said time interval to connect said second winding across said source, and a third relay responsive to magnitude of the charge on the one of said capacitors in said discharge circuit and operable when the capacitor is discharged to actuate said switching means and disable said first circuit and, when a charged capacitor is in the discharge circuit, to condition the first circuit for operation.

2. The combination of, two electromagnets having first and second windings respectively, means providing a source of unidirectional voltage, circuits operable selectively to connect either of said windings across said source while disconnecting the other winding therefrom, a plurality of capacitors each adapted to store energy for delivery to said second winding at a voltage substantially higher than the voltage of said source, a circuit adapted when closed to discharge one of said capacitors through said second winding, means for charging said capacitors with said energy, a first relay responsive to disconnection of said first winding from said source and operable substantially simultaneously therewith to complete said discharge circuit for a predetermined short time interval for discharge of the capacitor in the circuit and then open the circuit, a second relay responsive to disconnection of said first winding from said source and operable to connect said second winding to the source within said time interval, and a switching device adapted to connect said capacitors into said discharge circuit individually and in succession and operable in response to discharge of the capacitor in the discharge circuit and, after the latter is opened by operation of said first relay, to disconnect that capacitor and connect the next successive capacitor into the discharge circuit.

3. The combination of, two electromagnets having first and second windings respectively, a first circuit through which said first winding may be energized, a second circuit through which said second winding may be energized, means including a capacitor for storing electrical energy for delivery to said second winding at a voltage substantially higher than said first voltage, means for charging said capacitor with said energy, circuits adapted to be closed in response to interruption of said first circuit for discharging said capacitor through said second winding and for closing said second circuit to continue the energization of the winding at said low voltage, a relay controlling said first circuit and operable when pulled in to condition the circuit for closure and when dropped out to disable the circuit, a separate series circuit through said capacitor including a resistor and the coil of said relay for pulling in the latter when the capacitor charge reaches a predetermined high value and for dropping out of the relay when the capacitor charge drops to a predetermined low value, and a second resistor connected in series with normally open contacts of said relay across said coil thereof to cause drop out of the relay at a voltage higher than said low value.

4. The combination of, two electromagnets having first and second windings respectively, a first circuit through which said first winding may be energized, a second circuit through which said second winding may be energized at one voltage, means including a capacitor for storing electrical energy for delivery to said second winding at a voltage substantially higher than said one voltage, means for charging said capacitor with said energy, circuits adapted to be closed in response to interruption of said first circuit for discharging said capacitor through said second winding and for closing said second circuit to continue the energization of the winding at said low voltage, a relay controlling said first circuit and operable to condition the latter for operation when the relay is energized and to disable the first circuit when the relay is deenergized, and a separate series circuit through said capacitor including the coil of said relay and operable to energize the relay when the capacitor voltage reaches a predetermined high level and to deenergize the relay when the capacitor voltage reaches a predetermined low level upon discharge of the capacitor.

5. The combination of, first and second electromagnets having first and second windings, means providing a first source of unidirectional voltage including a bridge rectifier having a center tapped winding connected between the bridge input terminals, a first circuit adapted when closed to connect said first winding between one output terminal of said bridge and said center tap, a second circuit adapted when closed to connect said second winding between said center tap and the other bridge output terminal, a relay responsive to the condition of said first circuit and operable to interrupt said second circuit when said first circuit is completed and to complete the second circuit when the first circuit is interrupted, means providing a source of unidirectional voltage of a value substantially higher than that of said first source, third and fourth circuits adapted when closed to connect said high voltage source in series respectively with said first winding and with said second winding between said center tap and said other output terminal, the voltages of said sources aiding each other in said fourth circuit and opposing each other in said third circuit, and a relay responsive to the condition of said first circuit and operable upon interruption of the latter to complete said third and fourth circuits for a predetermined short interval of time and then open the circuits.

6. The combination of, first and second electromagnets each having a winding, a first circuit adapted when closed to energize said first winding, means including a rectifier providing a first source of unidirectional voltage, a second circuit operable when closed to connect said second winding in series with said rectifier to energize the winding at one voltage, means providing a source of unidirectional voltage of a value substantially higher than that of said first source, a third circuit through which said sources may be connected in series with said second winding with the voltages aiding each other, means controlling said third circuit in response to interruption of said first circuit and operable substantially simultaneously with such interruption to complete said third circuit for a predetermined short interval of time and then to interrupt the circuit to apply said higher voltage to said second winding for said interval, and means controlling said second circuit in response to interruption of said first circuit and operable to complete the second circuit within said interval to continue the energization of said second winding at said lower voltage.

7. The combination of, an electromagnet having a winding and a magnetic element, means including a rectifier providing a source of unidirectional voltage, a circuit adapted when closed to connect said winding in series with said rectifier to energize the winding at one voltage, a second circuit operable when closed to deliver energy to said winding at a voltage substantially higher than said one voltage and in series with said rectifier in the direction of current flow therethrough, and means for closing said second circuit for a predetermined short interval of time and then opening the circuit and for closing said first circuit within said time interval to provide a rapid build-up of flux in said element and then continue energization of said winding to maintain the flux.

8. In a control for an electromagnet having a winding, the combination of, a circuit including a unidirectional voltage source for energizing said winding at one voltage, a capacitor, means for charging said capacitor with energy for delivery to said winding at a voltage substantially higher than said one voltage, a second circuit adapted when closed to discharge said capacitor through said winding in a reverse direction, and a third circuit through said winding including the coil of a relay and a rectifier poled to block current from said source but to pass current from said capacitor and reverse current resulting from back voltages self-induced in the winding in response to interruption of said first circuit, said third circuit including normally closed contacts of said relay and a resistor connected in parallel with each other and in series with said coil and said second circuit including normally open contacts of said relay whereby said back voltages induced in said winding are utilized to pull in said relay to complete the third circuit and open said normally closed contacts in response to interruption of said first circuit for discharge of the major portion of said capacitor energy through the winding and a minor portion through said resistor and said coil to maintain the relay energized until the capacitor is substantially discharged.

9. The combination of, two electromagnets having first and second windings respectively, circuits for exciting each of said windings respectively at approximately the rated voltage of the winding and at a substantially higher overexcitation voltage, a relay having a coil in series with said first winding in the rated voltage one of said circuits for the latter and operable when the relay drops out in response to interruption of such circuit to complete a first one of said rated voltage circuits through said second winding, fast and slow relays connected in a separate circuit in series with said first winding for rapid pull-in of such relays in response to interruption of said rated voltage circuit through the winding and operable when pulled in to complete said high voltage circuits for said windings and a second rated voltage circuit for said second winding, and a timing circuit including a normally charged capacitor and completed by pull-in of one of said fast and slow relays for maintaining the latter energized for different time intervals, said fast relay dropping out to open said high voltage circuits before drop-out of said first relay and said slow relay dropping out after such drop-out of the first relay to maintain said second winding energized through said first rated voltage circuit after opening of said high voltage circuits.

10. The combination of, two electromagnets having first and second windings respectively, circuits for exciting each of said windings respectively at approximately the rated voltage of the winding and at a substantially higher overexcitation voltage, a relay having a coil in series with said first winding in a rated voltage one of said circuits for the latter and operable when the relay drops out in response to interruption of such circuit to complete a first rated voltage of one of the circuits through said second winding, fast and slow relays connected in a separate circuit in series with said first winding for rapid pull-in of the relays in response to interruption of said rated voltage circuit through the winding and operable when pulled in to complete said high voltage circuits for said windings and a second rated voltage circuit through said second winding, and a timing circuit completed by pull-in of one of said fast and slow relays for maintaining the latter energized for different time intervals, said fast relay dropping out to open said high voltage circuits before drop-out of said first relay and said slow relay dropping out after drop-out of the first relay to maintain said second winding energized through said first rated voltage circuit after opening of said high voltage circuits.

11. The combination of, a first electromagnetic device having a winding, a first circuit adapted when closed to energize said winding, a second electromagnetic device having a winding, a second circuit operable when closed to apply to said second winding a voltage of one value, a first relay having a coil in series with said first winding in said first circuit and operable to complete said second circuit when the relay drops out following interruption of the first circuit, means providing a source of energy for delivery to said second winding at a voltage substantially higher than said one value, third circuits operable when closed to connect said source to said second winding to overexcite the winding and to said first relay coil to energize the latter in a direction reverse to energization thereof through said first circuit for quick drop-out of the relay, and a second relay controlling said third circuits in response to back voltages self-induced in said first winding and operable upon interruption of said first circuit to close said third circuits.

12. The combination of, two electromagnets each having a winding, a first circuit adapted when closed to energize a first one of said windings, a second circuit adapted when closed to energize the second winding at one voltage, a third circuit adapted when closed to energize said second winding at a voltage substantially higher than said one voltage, a relay having a coil in series with said first winding in said first circuit and operable to complete said second circuit upon drop-out of the relay following interruption of the first circuit, a relay responsive to back voltages self-induced in said first winding upon interruption of said first circuit and operable to complete said third circuit for a predetermined short time interval following such interruption, and means responsive to interruption of said first circuit for accelerating drop-out of said relay to obtain closure of said second circuit before the end of said time interval, said last means including a fourth circuit adapted when closed to energize said relay coil in a direction opposite to energization thereof through said first circuit.

13. In a control for an electromagnetic device having a winding, the combination of, a first relay, a series circuit through the coil of said relay and said winding operable when closed to apply to the winding a unidirectional voltage of one value and to overexcite the relay coil by the flow of current therethrough of a value several times the rated current thereof, a second circuit operable when closed to deliver energy to said winding at a voltage substantially higher than said one value, a second relay connected in a third circuit through said winding for energization of the relay coil by back voltages self-induced in the winding upon interruption of said first circuit, said second relay having normally open contacts in said second circuit for completion of the latter when the relay pulls in, and a shunt circuit connected around said first relay coil and including normally open contacts of the first relay for completion of the circuit to reduce current flow in the coil to approximately its rated value when the first relay pulls in and normally closed contacts of said second relay for interrupting the shunt circuit to reduce drop-out time of the first relay when the second relay pulls in.

14. The combination of, two electromagnets each having a winding, a first circuit adapted when closed to energize a first one of said windings, a second circuit adapted when closed to energize the second one of said windings at a voltage within the rated voltage of the winding, a first relay having a coil in series with said first winding in said first circuit and operable to complete said second circuit upon drop-out of the relay in response to interruption of the first circuit, a third circuit adapted when closed to deliver energy to said second winding at a voltage substantially higher than said rated voltage, a second relay responsive to back voltages induced in said first winding upon interruption of said first circuit and operable to close said third circuit for a predetermined short interval of time following such interruption and then open the circuit, and means controlling said first relay in response to interruption of said first circuit and operable to accelerate drop-out of the first relay for completing said second circuit before the end of said time interval and drop-out of said second relay at the end of such interval.

15. The combination of, a first electromagnetic device having a first winding, a first circuit operable when closed to energize said winding and including the coil of a relay and a resistor in series with the winding, a manually operable switch connected in series in said circuit for completing the circuit when the switch is closed, said relay having normally open contacts connected in a shunt around said switch to maintain the circuit closed after the relay pulls in and the switch opens, a second electromagnetic device having a second winding, a second circuit operable when closed to energize said second winding and including normally closed contacts of the relay for interrupting the circuit and deenergizing the winding when the relay pulls in, both of said circuits being completed when said switch is closed and before said relay pulls in, and a shunt circuit connected around said relay coil and including normally open contacts of the relay for completing the shunt circuit in response to pull-in of the relay, said shunt circuit acting to reduce current flow in said coil from a value equal to several times the rated current of the coil when the shunt circuit is open to approximately the rated value when the shunt circuit is closed whereby the relay is overexcited upon initial closure of said switch to reduce the relay pull-in time and the time when both of said first and second circuits are completed.

16. The combination of, a first electromagnetic device having a first winding, a first circuit operable when closed to energize said first winding and including a manually operable switch for completing the circuit when the switch is closed, a relay having a coil connected in series with said first winding and normally open contacts connected in a shunt around said switch to maintain the circuit closed after the relay pulls in, a second electromagnetic device having a second winding, a second circuit operable when closed to energize said second winding and including normally closed contacts of the relay for interrupting the circuit and deenergizing the winding when the relay pulls in, both of said windings being energized when said switch is closed and before said relay pulls in, and a shunt circuit connected around said relay coil and including normally open contacts of the relay for completion of the shunt circuit in response to pull-in of the relay, the current in said coil being equal to several times the rated current of the coil when the shunt circuit is open and to approximately the rated value when the shunt circuit is closed whereby to overexcite the relay upon initial closure of said switch and reduce the relay pull-in time and the time when both of said windings are energized.

17. The combination of, first and second electromagnets each having a winding, means providing two sources of unidirectional voltage of relatively low and high values, a first circuit through which said first winding may be connected to said low voltage source for current flow through the winding in one direction, a second circuit adapted when closed to connect said first winding to said high voltage source for current flow in the opposite direction, a third circuit through said high voltage source and said second winding, means controlling said second and third circuits in response to interruption of said first circuit and operable substantially simultaneously with such interruption to complete said second and third circuits for a predetermined short time interval and then interrupt the latter circuits, and means responsive to interruption of said first circuit and operable within said time interval to connect said low voltage source to said second winding to continue energization of the latter in the same direction.

18. The combination of, a first electromagnet having a winding, a second electromagnet having a winding and a magnetic element, a first circuit adapted when closed to energize said first winding, a second circuit adapted when closed to energize said second winding at one voltage, means providing a source of voltage substantially higher in value than said one voltage, a third circuit for connecting said second winding to said source, means responsive to interruption of said first circuit to complete said third circuit for a predetermined short interval of time sufficient to produce a rapid build-up of flux in said magnetic element and then open the circuit, and means responsive to interruption of said first circuit and operable to complete said second circuit within said time interval to continue the energization of the second winding and maintain said flux.

19. The combination of, an electromagnetic device having a winding, a first circuit through said winding operable when closed to apply a relatively low unidirectional voltage to the winding to energize the same in one direction, a second circuit through said winding including the coil of a relay in series with normally closed contacts of the relay and a rectifier poled to pass current resulting from the back voltage induced in the winding upon interruption of said first circuit, said relay having a rated voltage substantially less than the back voltage induced in said winding upon interruption of first and second circuits, and a third circuit through said winding including normally open contacts of said relay and operable when completed by closure of such contacts to deliver energy to said winding at a voltage substantially higher than said low voltage and in a direction opposite to the latter, the back voltage induced in said winding upon interruption of said first circuit energizing said relay coil sufficiently to open said normally closed contacts and interrupt said second circuit and the back voltage induced in the winding upon interruption of the second circuit overexciting the relay to reduce the translation time of the relay and complete said third circuit rapidly.

20. In a control for an electromagnetic device having a winding, the combination of, a source of unidirectional voltage, a first circuit operable when closed to connect said winding to said source to energize the winding, a second circuit through said winding including the coil of a relay in series with normally closed contacts of the relay and a rectifier poled to block current from said source but to pass current resulting from the back voltage induced in the winding upon interruption of said first circuit, said relay having a rated voltage substantially less than the back voltage induced in said winding upon interruption of first and second circuits, and a third circuit including normally open contacts of said relay for completion of the circuit when the relay pulls in, the back voltage induced in said winding upon interruption of said first circuit energizing said relay coil sufficiently to open said normally closed contacts thereof and interrupt said second circuit whereby the back voltage is increased substantially to reduce the translation time of the relay and complete said third circuit rapidly.

21. The combination of, an electromagnetic device having a winding, a first circuit including a source of unidirectional voltage and adapted when closed to apply one voltage to said winding to energize the same in one direction, a second circuit adapted when closed to deliver energy to said winding in the opposite direction and at a voltage substantially higher than said one voltage, a relay having normally open contacts in said second circuit for completing the latter when the coil of the relay is energized, and a third circuit through said winding and said relay coil for utilizing back voltages self-induced in said winding to energize said relay coil at a voltage substantially higher than the rated voltage of the coil and thereby produce rapid closure of said normally open contacts to complete said second circuit in response to interruption of said first circuit, said third circuit including a rectifier connected in series with said coil and poled to block current flow from said source and to pass current produced by said back voltages to enable said second circuit to remain closed without energizing the coil while said winding is energized through said first circuit.

22. The combination of, an electromagnetic device having a first winding, a first circuit operable when closed to apply one voltage to said winding to energize the same in one direction, a second electromagnetic device having a second winding, means operable when actuated to deliver energy to said windings at a voltage substantially higher than said one voltage, the direction of energy delivery to said first winding being in a direction opposite to said one voltage, a relay having a coil and operable when the coil is energized to actuate said means and deliver said energy to said windings, and a circuit including said first winding and said coil in series for utilizing back voltages self-induced in the winding in response to interruption of said first circuit to energize the coil, said relay having a rated voltage substantially lower than said back voltages for overexcitation of the coil to reduce the normal translation time of the relay and actuate said means rapidly in response to interruption of said first circuit.

23. The combination of, an electromagnetic device having a winding, a first circuit operable when closed to apply a voltage of one value to said winding to energize the same in one direction, a second circuit operable when closed to deliver energy to said winding in the opposite direction and at a voltage having a value substantially higher than said one value, a relay having normally open contacts in said second circuit for completing the latter when the relay pulls in, said relay having a coil, and a third circuit including said winding and said coil in series for utilizing back voltages self-induced in the winding in response to interruption of said first circuit to energize the coil, said relay having a rated voltage substantially lower than said back voltages for overexcitation of the coil to reduce the normal translation time of the relay and complete said second circuit rapidly in response to interruption of said first circuit.

24. The combination of, a first electromagnetic device having a first winding, a first circuit operable when closed to energize said winding, a second electromagnetic device having a magnetic element and a second winding carried by the element, a second circuit operable when closed to deliver energy to said second winding in a predetermined amount and at a voltage sufficient to provide a quick build-up of flux in said magnetic element, a relay having normally open contacts in said second circuit for completing the latter when the contacts are closed by excitation of the relay coil, and a third circuit including said first winding and said relay coil in series and operable in response to interruption of said first circuit to apply the back voltages self-induced in the first winding due to such interruption to the relay coil to energize the latter at a voltage substantially higher than its rated voltage and thereby produce rapid closure of said contacts and completion of said second circuit.

No references cited.